H. BÜCHLER.
AUTOMATIC SIPHON.
APPLICATION FILED FEB. 6, 1909.
929,192. Patented July 27, 1909.
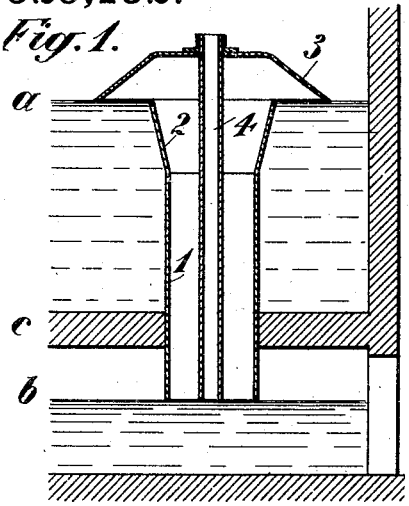
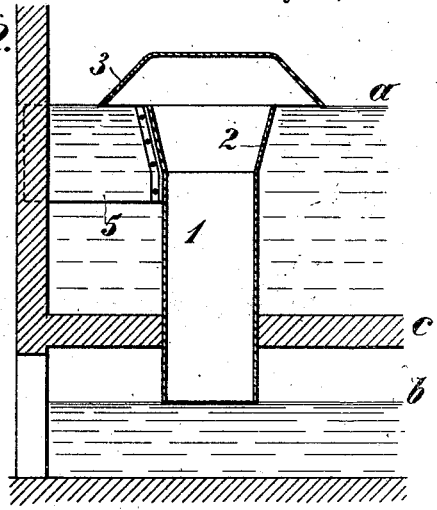
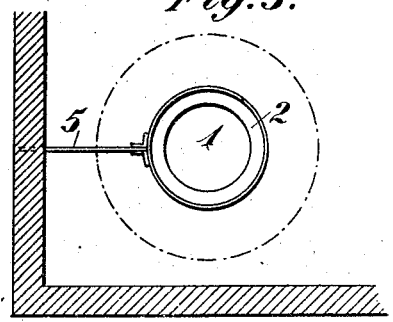
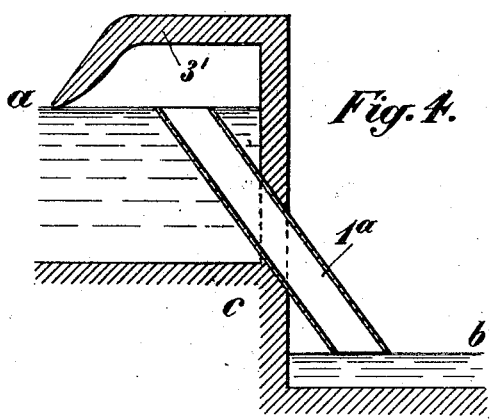
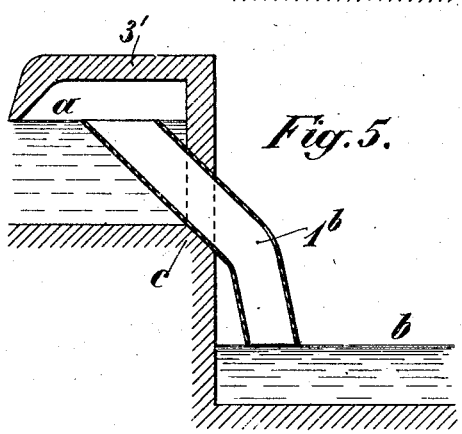
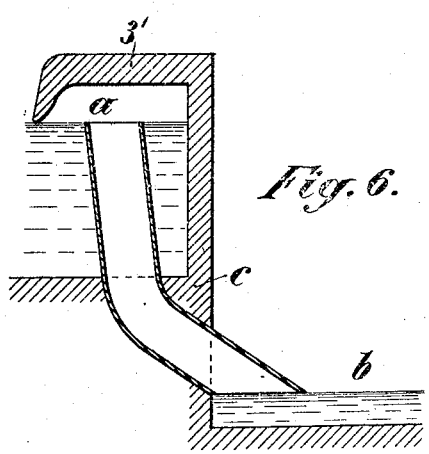
Witnesses
Jesse N. Sutton
Clarence J. Ernst
Inventor
Hans Büchler
by Henry Orth
atty

UNITED STATES PATENT OFFICE.

HANS BÜCHLER, OF ZURICH, SWITZERLAND.

AUTOMATIC SIPHON.

No. 929,192.　　　Specification of Letters Patent.　　　Patented July 27, 1909.

Application filed February 6, 1909. Serial No. 476,394.

*To all whom it may concern:*

Be it known that I, HANS BÜCHLER, a citizen of the Republic of Switzerland, and residing at Zurich, Switzerland, have invented certain new and useful Improvements in Automatic Siphons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to automatic siphons or automatic overflow regulators for controlling water levels, and has for its object to provide a structure that will rapidly assume its maximum efficiency upon slight variations of the upper water level, together with details of construction to be hereinafter described and claimed.

Referring to the drawings in which like parts are similarly designated, Figure 1 is a vertical section of one form of my invention. Fig. 2 is a modification thereof and Fig. 3 is a plan of Fig. 2. Fig. 4 is a further modification and Figs. 5 and 6 show other forms of the siphon columns.

Heretofore it has been customary to provide siphons at either their upper or lower ends or both with curved ends sealed by the water and these curved ends I entirely dispense with in my invention. Furthermore, such siphons have only from 30 to 40% efficiency while with the structure herein shown and described numerous experiments show an efficiency of about 90%.

$a$ is the upper water level or dominant pool, $b$ the lower level or race-way, separated from one another by means of a partition $c$. Passing through the partition $c$ is a column 1 of the siphon whose lower edge is slightly below the level of the discharge water in the race-way $b$ and its upper end is at the level to be maintained in the dominant pool $a$ and I have shown the shaft as enlarged or widened at its upper end 2 to form an enlarged mouth or entrance to the siphon column.

Over the upper end 2 I form a chamber or cap 3 whose lower edges are at or slightly below the water level to be maintained in the dominant pool $a$. So much of this structure is operative to a large degree and in order to increase the efficiency I have shown a central pipe 4 whose lower end is sealed by the discharge water $b$ or tail race, and whose upper end passes through the cap or bell 3, and is open to the atmosphere.

The operation is as follows:—A very slight rise in the upper level will cause the water in the dominant pool $a$ to overflow the edges of the upper enlarged end 2 of the shaft 1, carrying with it a certain quantity of air which is discharged into the discharge water below the partition $c$. Thus the air is continually exhausted, increasing the vacuum in the hood or cover 3, thereby causing the water between the edge of the cover 3 and the mouth or upper end of the shaft to rise and maintain a higher level over the edge of the mouth of the column than the level of the water outside of the hood 3. The degree of vacuum is constantly increased until the hood 3 is entirely filled with water. In order to more rapidly cause the siphon to reach its maximum efficiency, I provide the pipe 4, so that the bubbles of air that are carried down into the lower body of water $b$ when rising to the surface, will break within the pipe 4 and discharge therethrough into the atmosphere.

In Figs. 2 and 3 I have shown a slight modification, which comprises providing adjacent the column at the water level a vane or vanes 5, and this prevents the formation of eddies in the water during the operation of the siphon. In Figs. 2 and 3 I have shown but a single vane, but it is, of course, obvious that any number of vanes, here shown as being perpendicular, may be provided around the top of the column.

In Fig. 4 I have shown a modification in which the siphon $1^a$ is perfectly straight and of uniform diameter throughout, but inclined, its entrance and exit, however, are in substantially horizontal planes. Its upper end is covered by a suitable cover or hood $3'$, similar to the cover of Fig. 1, and identical in its operation.

In Fig. 5 I have shown column $1^b$ of uniform diameter throughout but slightly bent, and in Fig. 6 I have shown another form of bent column. As soon as the partial vacuum in 3 or $3'$ has been set up, the usual contraction or diminution of suction of the water entering the top of a column disappears, and the same is the case at the exhaust or discharge end of the column. The water issuing from the lower end of the column is not broken up, as is sometimes the case in siphons, but issues in a solid stream. It also happens, especially in large structures of this kind, before the column is completely filled with water, that the stream of water passing through the column is broken up, especially at its lower end, thus decreasing its efficiency for entraining air therewith, and this is entirely avoided by the siphon forming the subject matter of my invention, and furthermore the water is uniformly distributed around the column from its entrance to its exit, consequently the suction effected is greater, and the cover or bell is rapidly exhausted of air.

I claim—

1. Automatic overflow regulator, comprising a siphon column extending from the upper to the lower liquid level, whose upper end is directed upwardly and whose lower end is directed downwardly, in combination with a hood over the upper end of the column, whose edges are at or below the level of the liquid to be controlled.

2. Automatic overflow regulator for maintaining a constant liquid level, comprising a pipe extending from the upper to the lower liquid level, whose upper end is enlarged and directed upwardly and whose lower end is directed downwardly, and located at the respective normal liquid levels, in combination with a hood over the upper end of the pipe, whose edges are at or below the level of the liquid to be controlled.

3. An automatic overflow regulator for maintaining a constant liquid level, comprising a pipe extending from the upper to the lower liquid level, having a conical mouth directed upwardly and whose lower end is directed downwardly; in combination with a hood over the upper end of the pipe and whose edges are at or below the level of the liquid to be controlled.

4. Automatic overflow regulator for maintaining a constant liquid level, comprising a column extending from the upper to the lower level, whose upper end is directed upwardly and whose lower end is directed downwardly and located at the respective normal liquid levels, in combination with a hood over the upper end of the column, whose edges are at or below the level of the liquid to be controlled, and a pipe terminating within the column substantially at its exit and discharging into the atmosphere outside the column.

5. Automatic overflow regulator for maintaining a constant liquid level, comprising a column extending from the upper to the lower liquid level, whose upper end is directed upwardly and whose lower end is directed downwardly and located at the respective normal liquid levels; in combination with a hood over the upper end of the column, whose edges are at or below the level of the liquid to be controlled, and a pipe contained within the column extending from substantially the lower liquid level to and through the hood.

6. Automatic overflow regulator for maintaining a constant liquid level, comprising a pipe extending from the upper to the lower liquid level, whose upper end is directed upwardly and whose lower end is directed downwardly and located at the respective normal liquid levels; in combination with a hood over the upper end of the pipe, whose edges are at or below the level of the liquid to be controlled and means to prevent eddies at the entrance of the hood.

7. Automatic overflow regulator for maintaining a constant liquid level, comprising a pipe extending from the upper to the lower liquid level, whose upper end is directed upwardly and whose lower end is directed downwardly and located at the respective normal liquid levels; in combination with a hood over the upper end of the pipe whose edges are at or below the level of the liquid to be controlled, and perpendicular vanes or plates in proximity to the entrance to the hood.

8. An automatic overflow regulator for maintaining a constant liquid level, comprising a column extending from the upper to the lower liquid level, whose upper end is directed upwardly and whose lower end is directed downwardly and located at the respective normal liquid levels; in combination with a hood over the upper end of the column, whose edges are at or below the level of the liquid to be controlled, a pipe contained within the column extending from substantially the lower liquid level to and through the hood, and perpendicular vane or vanes secured to the upper end of the column and extending past the edges of the hood.

In testimony that I claim the foregoing as my invention, I have signed my name in presence of two subscribing witnesses.

HANS BÜCHLER.

Witnesses:
 EDUARD SPIEKER,
 M. SCHUMANN.